United States Patent [19]

Wood et al.

[11] Patent Number: 4,963,877
[45] Date of Patent: Oct. 16, 1990

[54] SYNTHETIC APERTURE RADAR

[75] Inventors: James W. Wood; Christopher J. Oliver; Ian P. Finley, all of Worcester; Richard G. White, Worcestershire, all of England

[73] Assignee: The Secretary of State for Defence in Her Britannic Majesty's Government of the United Kingdom of Great Britain and Northern Ireland, London, England

[21] Appl. No.: 435,478
[22] PCT Filed: May 24, 1988
[86] PCT No.: PCT/GB88/00408
  § 371 Date: Dec. 5, 1989
  § 102(e) Date: Dec. 5, 1989
[87] PCT Pub. No.: WO88/10434
  PCT Pub. Date: Dec. 29, 1988

[30] Foreign Application Priority Data
  Jun. 24, 1987 [GB] United Kingdom ................. 8714746

[51] Int. Cl.$^5$ .............................................. G01S 9/02
[52] U.S. Cl. ...................................................... 342/25
[58] Field of Search .......................................... 342/25

[56] References Cited
U.S. PATENT DOCUMENTS 4,034,370 7/1977 Mims .
4,084,158 4/1978 Slawsby .
4,692,765 9/1987 Politis et al. .

Primary Examiner—Thomas H. Tarcza
Assistant Examiner—Mark Hellner
Attorney, Agent, or Firm—Nixon & Vanderhye

[57] ABSTRACT

A synthetic aperture radar system includes a distortion correction device arranged for autofocussing of raw data by contrast maximization. Reference functions are selected on the basis of a range of trial accelerations. The acceleration producing the highest contrast is taken as the current radar platform across-track acceleration. This information is used to generate phase and range corrections for the data.

7 Claims, 6 Drawing Sheets

SYNTHETIC APERTURE RADAR

This invention relates to synthetic aperture radar, and more particularly to a synthetic aperture radar system arranged to counteract imaging errors due to radar platform divergence from a linear track.

Synthetic aperture radar (SAR) is a known technique for increasing radar resolution. Unlike conventional radars employing a reflecting dish antenna to focus radiation, SAR involves a fixed radar system on a moving platform such as an aircraft or a satellite. Normally, although not necessarily, the radar antenna emits radiation in a direction broadside to the platform track. The radar beam typically has a fan-shaped profile. As scattering objects enter the beam, they begin to reflect signals back to the radar system. They continue to produce radar returns until movement of the radar platform along its track takes them out of the beam. At any time along track, the radar system is accordingly receiving signals from all scattering objects within the beam, and can locate each scatterer in the range or across track dimension from pulse time of flight.

A typical aircraft-borne SAR system would be used to monitor a target area at a distance in the order of 50 Km from the aircraft track. The target depth or range variation in the across track dimension is typically 9 Km. Each radar pulse produces a multiplicity of returns which are separated in the time or across track range dimension. The returns are divided by time gating into a large number of range gates. 6,000 range gates and a target depth of 9 Km for example correspond to a range resolution of 1.5 meters and a time gating interval of 10 nanoseconds, the time taken for radiation to travel 3 meters.

The range gating procedure provides no information on location of scatterers within the radar beam in the along-track or azimuth dimension. All scatterers within each range gate contribute to the instantaneous signal at the SAR antenna. In effect the antenna performs a vector summation of amplitude contributions received at any instant. It detects only the resultant of these contributions to provide what is referred to as a raw data value for each range gate.

In order to improve resolution in the azimuth dimension, SAR uses a number (~500) of successive raw data values for each range gate. This is equivalent to analysing the history of scatterers as they pass through the beam. When a scatterer enters or first becomes illuminated by the radar beam, the aircraft radar platform has a positive component of velocity towards it. This component falls to zero when the scatterer is broadside on, and then becomes increasingly negative as the scatterer recedes relative to the aircraft. The frequency of the radar return from a scatterer is accordingly Doppler shifted to a degree which varies as it passes through the radar beam. In order to produce a focussed image of a scatterer based on its scattering history as it passes through the beam, its signals require relative adjustment to correspond to a single Doppler value. Conveniently, this value is arranged to be zero so that scatterers are focussed at the broadside on or zero Doppler position relative to the aircraft. To achieve this, raw SAR data values are multiplied by a respective phase factor taken from a correlation reference function $e^{i\alpha x^2}$, where $\alpha$ is a constant and x is a position-in-beam variable; x varies from a maximum positive value at the trailing edge of the radar beam aft of the aircraft, to zero broadside on and to a maximum negative value at the beam leading edge. The multiplied values are summed to provide a single focussed image point. This procedure is carried out for each range gate over successive sets of raw data values, eg values 1 to 500, 2 to 501, 3 to 502... r to 499+r, to produce a focussed image in azimuth for each range gate. Mathematically it is expressed as follows;-

$$Y_n = \sum_{k=1}^{L} a_k d_{n+k} \tag{1}$$

where
  $Y_n$ = nth focussed image point amplitude having in-phase and quadrature components $P_n$ and $Q_n$;
  $a_k$ = kth phase factor coefficient or function value of the correlation reference function $e^{i\alpha x^2}$, where $x = (\frac{1}{2}L - k)\delta x$ and $\delta x$ = distance along aircraft track between emission of successive radar pulses;
  $d_{n+k}$ = (n+k)th complex raw data value having in-phase and quadrature components $p_n$ and $q_n$; and
  L = Length of synthetic aperture, ie number of raw data values processed per image point, eg 500.

Equation (1) is mathematically a correlation operation in which a stream of data values is correlated with a reference function $e^{i\alpha x^2}$. It is equivalent to optical focussing with a lens and to electronic matched filtering. Strictly speaking, each range gate should be processed with a different correlation function, since relatively more remote range gates would require a longer focus "lens". However, in practice, up to about 250 range gates may be processed adequately with one function, and a total of 6,000 range gates would require 24 or more functions. Use of a small number of functions reduces signal processing complexity and corresponds to an optical system with a fairly large depth of focus.

The correlation operation is frequently referred to as time domain processing. An alternative approach is known as frequency domain processing, and is mentioned here for completeness. It is described by A. B. E. Ellis in The Radio and Electronic Engineer, Vol. 53, No.3, pp 107-114, Mar.1983. It involves Fourier transformation of data followed by multiplication by a coefficient set and subsequent Fourier inversion.

One major problem in SAR imaging is the selection of the correct reference function or matched filter in order to achieve the equivalent of good image focussing and produce reliable image point values $Y_n$. If an inappropriate reference function is employed, the image is misfocussed. One approach to function selection employs the raw SAR data itself. This is referred to as autofocussing, and is discussed in Memorandum No. 3790 of the British Royal Signals and Radar Establishment, which is publicly available. It describes three approaches to obtaining correct autofocussing or selection of an appropriate reference function. The approaches comprise power spectrum measurement, image contrast maximisation and registration of "multilook" images. Of these, power spectrum measurement is shown to be an unreliable autofocussing aid, but the other two approaches are both recommended for use. The autofocussing problem arises in the case of aircraft-borne SAR in particular, because divergence of the aircraft from its intended track alters the frequency and phase of received radar returns. In consequence SAR Doppler processing and the matched filter or reference function required to produce focussing should vary also. The autofocussing process consists of determining from received radar returns the appropriate reference function. Autofocussing by contrast maximisation described in the above RSRE Memo No.3790 consists of processing raw data on a trial and error basis using a set of reference functions corresponding to a set of trial along-track aircraft platform velocities. That velocity which produces the best image contrast is taken as the optimum, and the processed image at this velocity is taken to be the true image.

Although contrast maximisation normally produces a reasonably well focussed image, the image is in general distorted. This is because the aircraft flight path is not a line which is straight to the required accuracy. Even with state of the art motion compensation systems, it is impractical to achieve such accuracy, since it would require divergences from track for example to be smaller than the radar wavelength to avoid significant errors in the phase of received data. At a typical SAR wavelength of 3 cm (10 GHz), this would require the aircraft track to be straight line to within about 8 mm over a distance in the order of $\frac{1}{4}$ kilometre to produce well focussed images. Moreover, to produce undistorted or geometrically correct images, the aircraft flight direction must not change by more than $10^{-4}$ radian over a flight of length in the order of 10 kilometres. This is quite impractical, and the result is distorted, misfocussed images. Furthermore, and most importantly, radar images produced by different aircraft flights are misfocussed and distorted differently in addition to being rotated and translated relative to one another. It is accordingly extremely difficult to compare different images to monitor change in a scene.

The conventional procedure for comparing airborne SAR images is complex and time consuming. It involves a person comparing two images to identify a large number (many hundreds) of reference points on one image which also appear with relative distortion in the other image. Point by point corrections are then calculated to re-distort one image so that it can overlie the other after suitable relative translation and rotation. This is referred to as the "rubber sheet" correction approach, and it requires many hours of skilled operator effort. In principle a computer might be employed to identify reference points, but in practice this is impractical because of imperfect image focussing. In any event, the final two images, one distorted and the other redistorted, still do not represent a reliable terrain image, although at least they may be compared for scene change determination.

In the Proceedings of IGARSS '86 Symposium, Zurich, Sept. 8-11, 1986, D Blacknell et al describe the prediction of geometric distortion in airborne SAR imaging by autofocus measurements. They show that an important contribution to distortion arises from the aircraft's velocity perpendicular to its intended track. They propose correcting the reference functions used to produce focussing to adjust for across-track velocity. This implies redetermining the correct reference functions from contrast maximisation periodically along the aircraft track. Computationally this would be a time consuming procedure. Ideally, to minimise computation and storage requirements as few functions as possible should be employed. Moreover, it would introduce the equivalent of edge errors, since discontinuities would be introduced in the image as portions of it are processed by abruptly changing reference functions. The procedure only compensates for errors due to across track velocity, as the authors state it does not compensate for range errors introduced by this velocity. Consequently, if the proposals of Blacknell et al are followed, the final image is only partly distortion corrected, and this at the expense of substantial computational complexity.

It is an object of the present invention to produce an alternative means for correcting distortion in SAR images.

The present invention provides a synthetic aperture radar system including:

(1) means for generating raw synthetic aperture radar data;

(2) means for
  (a) processing the raw data on the basis of trial across-track platform accelerations to obtain successive estimates of that acceleration,
  (b) correcting the phase and range of the raw data in accordance with across-track position and velocity obtained from successive acceleration estimates, and
  (c) correlating phase-corrected raw data on the basis of reference functions selected in accordance with corrected range to provide image data; and (3) means for storing and/or displaying the image data as a function of azimuth and corrected range.

The invention provides the advantage that comprehensive distortion correction is obtained, ignoring the inevitable SAR errors associated with variation in height above sea level giving rise to apparent range change. Moreover, it is unnecessary to modify reference functions to correct distortion. The range and phase of raw SAR is corrected to a linear baseline along the initial radar platform velocity vector. The approach of correcting the data rather than modifying reference functions has been found to be capable of producing image data accurate to about two range resolution intervals. This compares with distortions of around fifty or more resolution cells in uncorrected SAR imaging.

The invention provides corrections for raw SAR data on the basis of estimated across acceleration. The along-track velocity approach of RSRE Memo No 3790 is in fact erroneous, because it has been found that the major contribution to image distortion and misfocussing is across-track motion.

The invention may include means for rotating and translating an image of a scene into accurate registration with a different image of the scene. This embodiment may also include means for displaying the images alternately when in registration, such that scene features present in one image but not the other present an easily identified flickering aspect.

Across-track acceleration may be determined by a procedure involving "multilook" image registration. This procedure involves identifying a trial across-track acceleration producing the best registration between two images formed in respective halves of the radar beam. In a preferred embodiment however, across-track acceleration is determined by a contrast maximisation process. A first correlator is arranged to process raw data at low resolution to identify a subset of range gates exhibiting high contrast. The subset is then reprocessed in a second correlator at high resolution on the basis of a series of trial across-track accelerations. That acceleration yielding highest contrast over the subset is taken to be the current acceleration, and is employed together with past accelerations to update the radar platform across-track velocity and position. These provide corrections to the raw data phase and range for subsequent high resolution processing to produce geometrically accurate and correctly focussed image data. There is no requirement for time-consuming and expensive human operator involvement in image correction.

In order that the invention might be more fully understood, an embodiment thereof will now be described, by way of example only, with reference to the accompanying drawings, in which:

FIG. 1 schematically shows a conventional radar system for generating raw SAR data;

FIGS. 2 and 3 respectively illustrate ideal and practical (distorted) SAR imaging geometry;

Figure 4:
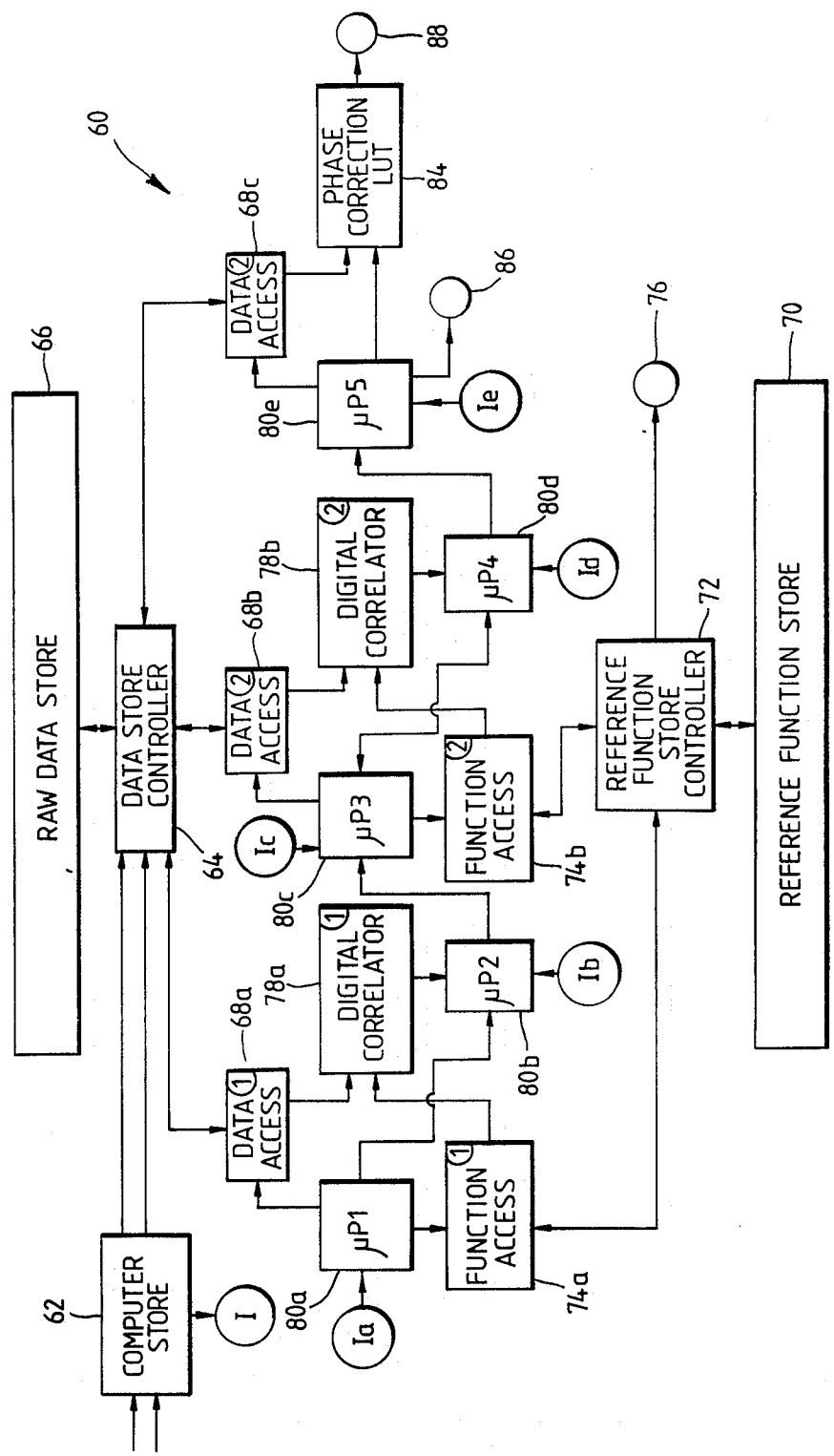
FIG. 4 is a schematic block diagram of a SAR data correction device in accordance with the invention.
Figure 5:
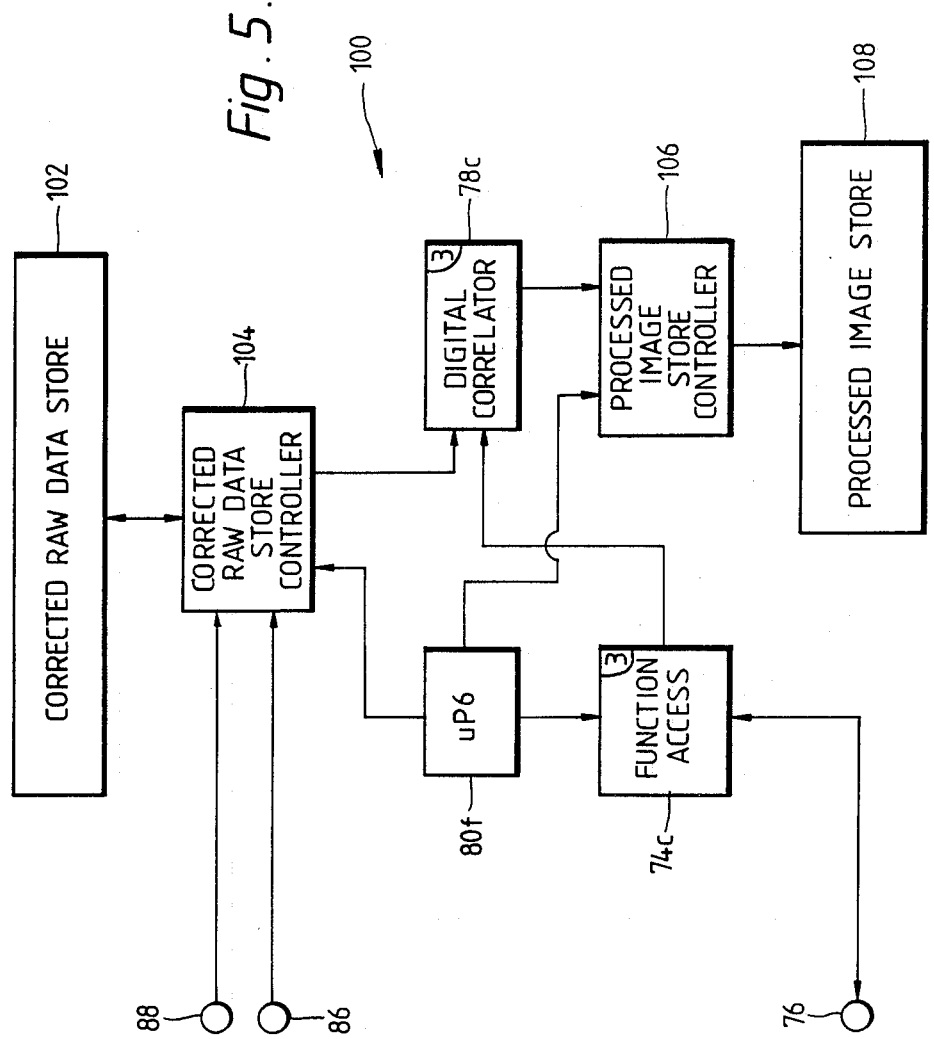
FIG. 5 is a schematic block diagram of a SAR processing device for use in conjunction with the device of FIG. 4.
Figure 6:
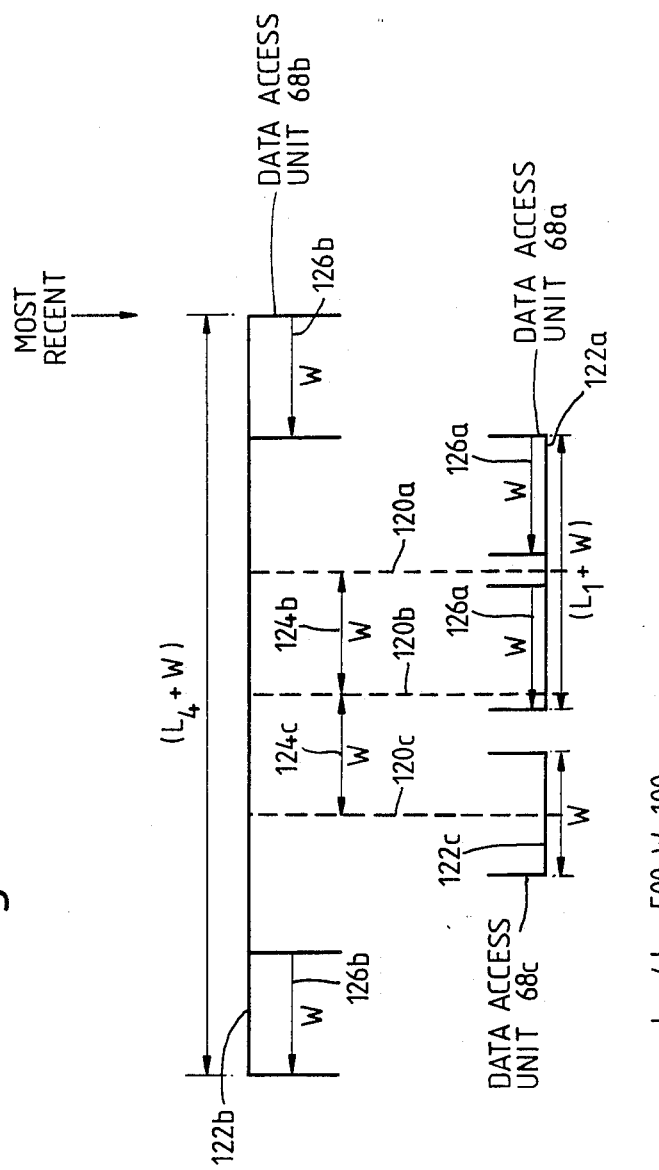
Figure 7:
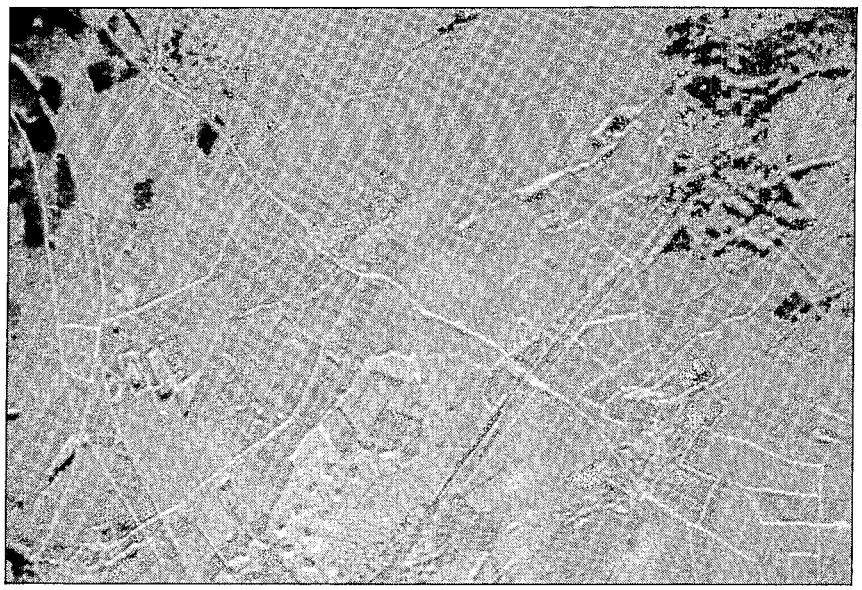
Figure 8:
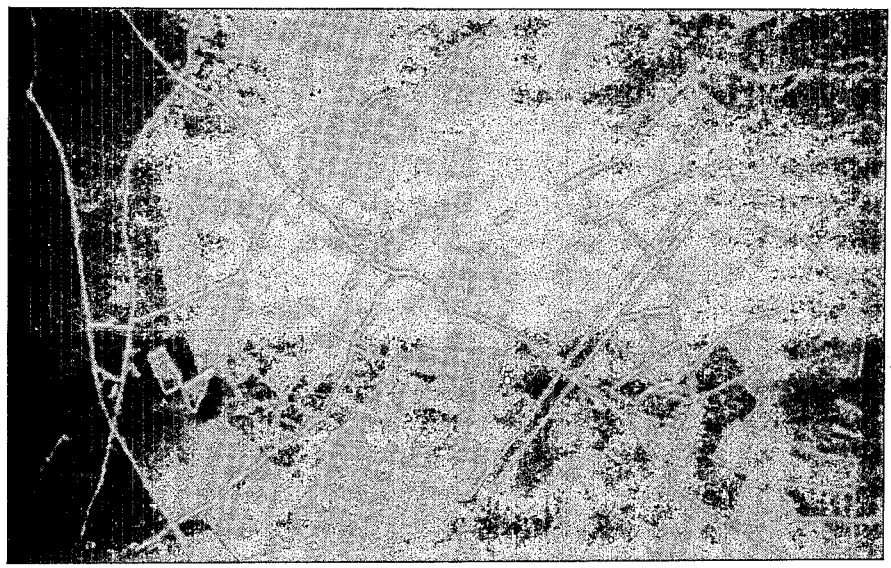

FIG. 6 schematically illustrates data access timing in the FIG. 4 and 5 devices; and FIGS. 7 and 8 respectively illustrate comparison with a map of an uncorrected SAR image and a SAR image corrected in accordance with the invention.

Figure 1:
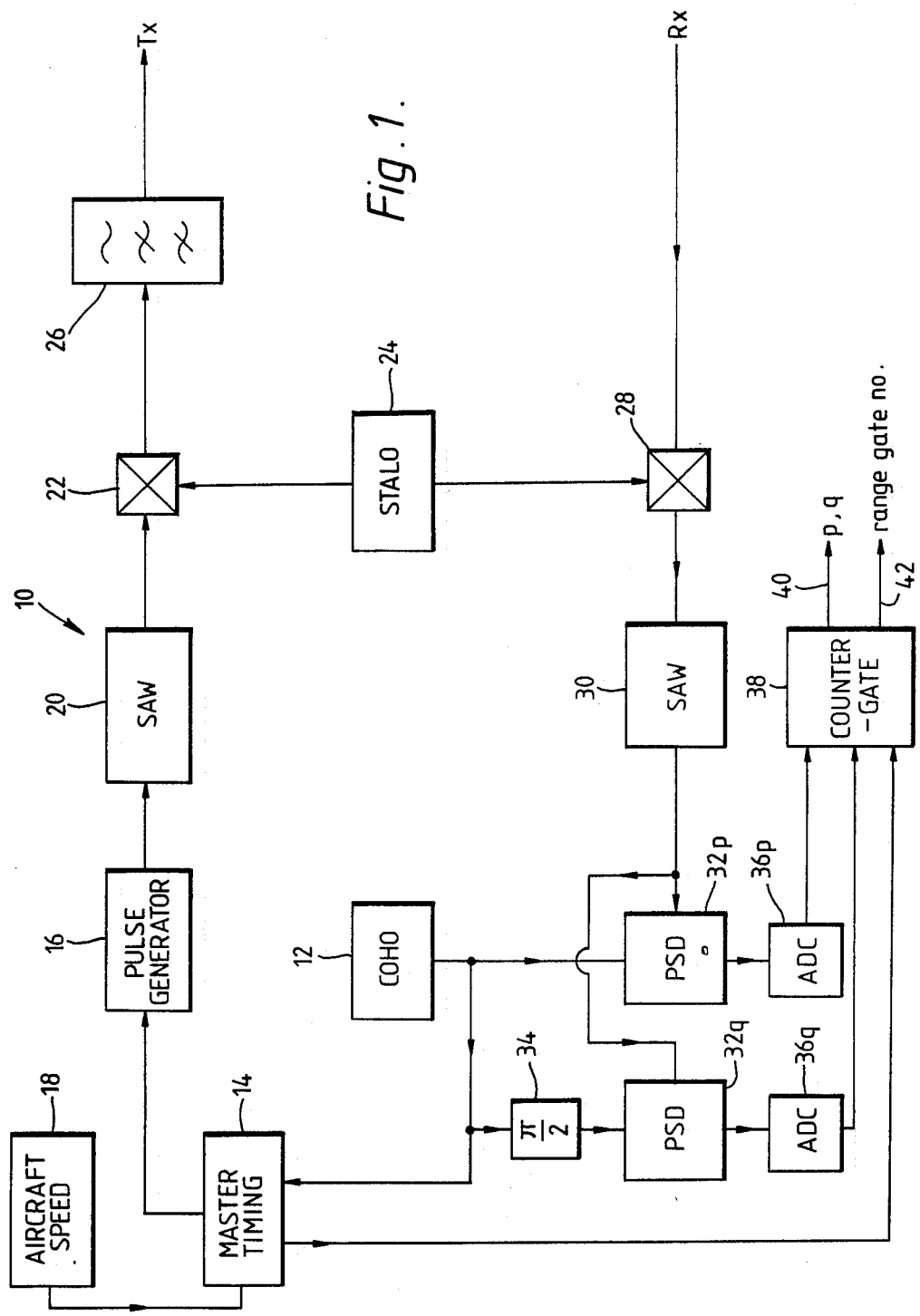

Referring to FIG. 1, there is schematically shown a conventional aircraft-borne radar system indicated generally by 10. The system 10 is suitable for producing raw SAR data for subsequent correlation with a set of reference functions to produce a focussed image. It incorporates a coherent oscillator or COHO 12 generating a 5 MHz signal which passes under the control of a master timing unit 14 to a pulse generator 16. The unit 14 receives an aircraft speed indication from a device 18, and controls the pulse generator 16 in accordance with that indication. The result is that radar pulses are produced at regular distance intervals along the aircraft track; ie pulse emission intervals are corrected for aircraft speed variation. The pulse repetition frequency is therefore not constant, but is typically in the region of 1.6 kHz.

Pulses pass from the pulse generator 16 to a surface acoustic wave (SAW) device 20 which imposes linear frequency modulation or "chirp". Modulated pulses are mixed at 22 with a 10 GHz signal from a stable local oscillator (STALO) 24. Mixed signals are high pass filtered at 26, and the resulting frequency modulated RF signals pass as indicated at Tx for transmission by an antenna (not shown).

Signals received from the antenna pass as indicated at Rx to a second mixer 28, where they are mixed once more with the 10 GHz STALO signal to remove the RF carrier wave. A second SAW device 30 removes frequency modulation from or "dechirps" the intermediate frequency difference signal. The dechirped signal passes to two phase sensitive detectors 32$p$ and 32$q$ arranged in parallel. The detectors 32$p$ and 32$q$ receive as reference signals the COHO signal in phase and this signal phase-shifted by $\pi/2$ at 34. They consequently produce in-phase and quadrature raw data signals or p and q values in analogue form. These signals are output to respective analogue to digital converters (ADC) 36$p$ and 36$q$, which digitise them into three-bit values. The digital values pass to a countergate unit 38, this unit receiving timing pulses at 10 nanosecond intervals from the master timing unit 14. The first timing pulse is received by the counter-gate unit 38 after a time interval has elapsed after emission of the first radar pulse; the time interval is equal to that necessary for the radar pulse to reach the near edge of the scene region being monitored and return plus signal processing delays in circuit elements subsequent to timing unit 14. Each timing pulse gates the unit 38, which counts it and outputs the corresponding digital raw data values p and q together with the timing pulse count. The timing pulse count is the range gate number, and the number of first timing pulses each indicating the beginning of a radar return is the radar pulse or sample number. The counter-gate unit 38 has two outputs 40 and 42. Output 40 provides successive raw data values of six bits and comprising the combined three-bit p and q values, and output 42 provides the corresponding range gate number together with the radar pulse or sample number.

Figure 2:
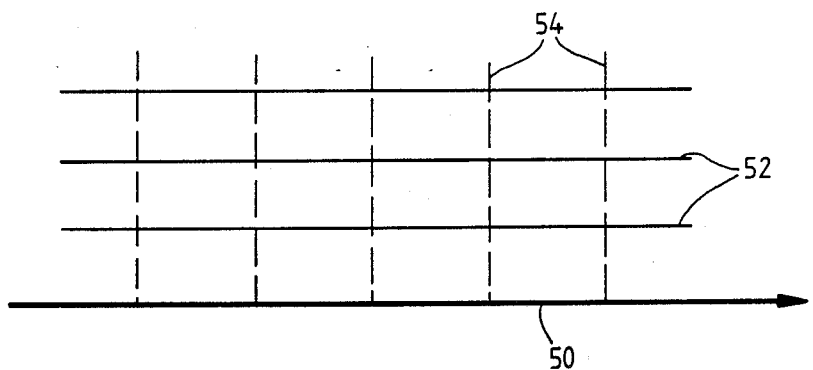
Figure 3:
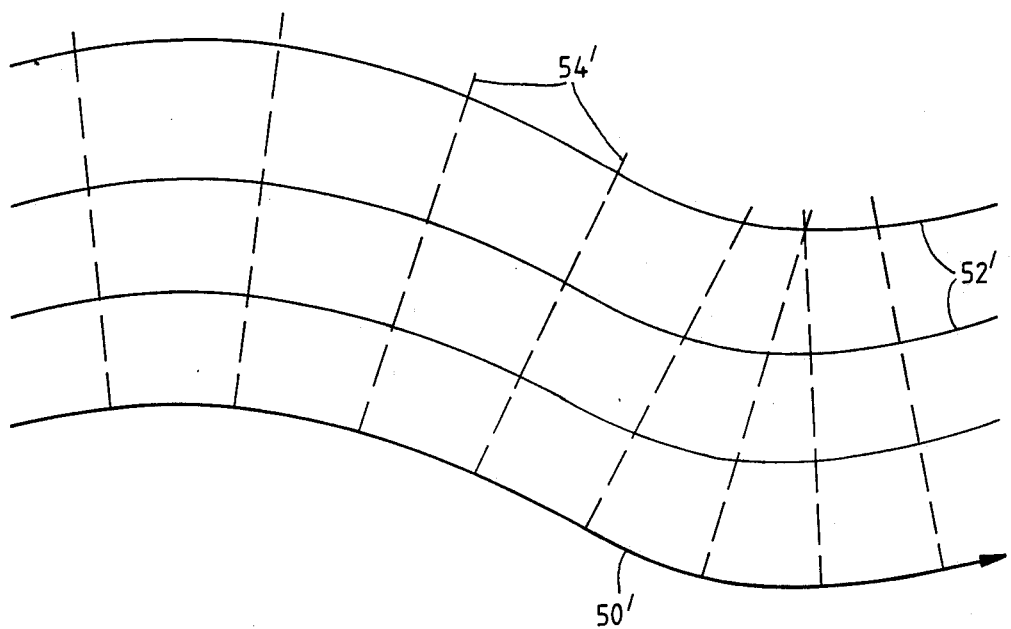

Referring now to FIGS. 2 and 3, there are schematically shown representations of ideal and practical or real SAR imaging geometries respectively. In FIG. 2, an ideal accurately linear aircraft track 50 is shown. Lines such as 52 indicate loci of constant range, and chain lines such as 54 indicate successive SAR antenna boresight or centre beam directions. The lines 52 and 54 are respectively parallel and perpendicular to the track 50; ie imaging geometry is rectilinear. In FIG. 3, in which features equivalent to those shown in FIG. 2 are like referenced with a prime superscript, the effect on imaging geometry produced by a real curvilinear aircraft track 50' is shown. Antenna boresight directions 54' remain perpendicular to the track 50', but are no longer parallel to one other. Consequently, lines 53' of constant range become curvilinear. This is the source of geometrical image distortion obtained in a focussed SAR image.

Distortion correction of SAR imagery in accordance with the invention will now be described. Initially, an outline of mode of operation will be given, to be followed by a more detailed discussion.

Referring to FIG. 4, there is shown a data correction device indicated generally by 60, which forms part of a distortion corrected SAR system of the invention. Raw data from the FIG. 1 radar system 10 is fed to a computer store 62, and thence to a data store controller 64 for loading into a raw data store 66. Each complex raw data value is stored in the store 66 at an address appropriate to its range gate and pulse numbers. The store controller 64 communicates with first, second and third data access units 68$a$, 68$b$ and 68$c$. The data correction device 60 includes a reference function store 70 which furnishes functions under the control of a function store controller 72. A range gate number presented to the controller 72 results in output of successive values of a respective function appropriate to that gate number from the store 70. The controller 72 supplies reference functions to first and second function access units 74$a$ and 74$b$, and also to an output 76 for use as will be described later. A first digital correlator 78$a$ receives data from access unit 68$a$ and reference functions from the first function access unit 74$a$, the data and function access units 68$a$ and 74$a$ being controlled by a first microprocessor ($\mu$P) 80$a$.

Output from the first correlator 78$a$ corresponds to distorted and partially focussed or misfocussed image data; it is passed to a second microprocessor 80$b$, which computes image data contrast. The microprocessor 80$b$ selects the sixteen highest contrast range gates for transfer to a third microprocessor 80$c$, which controls raw data and reference function supply from units 68$b$ and 74$b$ respectively to a second digital correlator 78$b$. The correlator 78$b$ performs a series of correlations or focussing operations on the raw data from each of the best contrast range gates. It employs a respective series of reference functions from the store 70 for each range gate. Each function is selected in accordance with a respective aircraft across-track acceleration, so data from each range gate is processed on the basis of a set of trial across-track accelerations.

The output of the second correlator 78b passes to a fourth microprocessor 80d, which computes a respective sum of contrasts for the sixteen range gates for each trial acceleration. That acceleration corresponding to maximum contrast is passed back to the third microprocessor 80c to form the basis for subsequent trial accelerations; the acceleration is also passed on to a fifth microprocessor 80e. The fifth microprocessor 80e stores all maximum contrast accelerations obtained from the beginning of SAR imaging. This microprocessor is programmed to calculate the aircraft across-track position from the across-track acceleration history. The computation assumes that initial across-track velocity and position errors are zero, this being equivalent to relating subsequent across-track positions to a line through the initial position and along the initial velocity vector of the aircraft.

The computed across-track position error provides corrections to both the phase of each raw data value and to its corresponding range gate number. The SAR data is corrected to that which would have been obtained if the aircraft had maintained its initial flight direction accurately, and consequently both phase and range gate corrections to subsequent data are necessary.

The microprocessor 80e calculates a range gate correction factor by dividing the across-track position error by the depth of, or range interval defined by, each range gate. It then adds this factor to each raw data range gate number to obtain corrected numbers. It computes a phase correction factor by multiplying the across-track position error by twice the radar wavenumber. Both correction factors are constant for all range gates and raw data between adjacent updates in the correction factor computation. The factors are positive or negative according to whether the position error increases or shortens the range respectively.

Having computed correction factors, microprocessor 80e supplies successive uncorrected range gate numbers to the third data access unit 68c. This obtains successive raw data values from the data store for input to a phase correction look-up table or LUT 84. The microprocessor 80e supplies successive corrected range gate numbers to an output 86, and outputs the computed phase correction factor to the LUT 84. Each raw data value and the phase correction factor combine to form an address for the LUT 84, which consists of a readonly memory. The LUT 84 responds to an address by outputting a corrected data value at 88. Outputs 86 and 88 consequently provide successive corrected range gate numbers each with an associated corrected data value.

Referring now also to FIG. 5, there is shown a SAR processing device 100 arranged to perform correlation operations on corrected data and assign the resulting focussed image data to corrected range gate numbers. The device 100 employs reference functions, corrected data and corrected range gate numbers obtained from outputs 76, 88 and 86 of the distortion correction device 60 of FIG. 4, these outputs being shown in FIG. 5 also.

The processing device 100 comprises a corrected data store 102 accessed via a store controller 104 connected to corrected data and range gate outputs 88 and 86 of the correction device 60. A sixth microprocessor 80f is arranged to activate the store controller 104 to feed corrected data to a third digital correlator 78c. The microprocessor 80f also actuates a third reference function access unit 74c to obtain reference functions from the FIG. 4 function store 70 via output 76. The access unit 74c supplies an appropriate function for each corrected range gate number to the correlator 78c, which correlates corrected data values in the manner of conventional SAR processing. Focussed image data output from the correlator 78c is output via a processed image store controller 106 to an image store 108, each image point being stored at an address corresponding to its corrected range gate number. This procedure is repeated until the image store 108 contains a set of image points for each range gate, this being the required correctly focussed, distortion corrected SAR image data for all radar pulses since the preceding update or correction factor determination. This data is that obtained from a section of the aircraft track. Data from later sections of track are obtained by repeating the foregoing procedure with more recently obtained uncorrected SAR data from the radar system 10 of FIG. 1.

Circuitry in FIGS. 4 and 5 suffers from potential bottlenecks at the raw data store 66 and reference function store 70. The data and function access units 68a to 68c and 74a to 74c may be in the position of requiring store access simultaneously. In practice this is easily obviated by having three stores 66 and three stores 70 containing identical information and responding to a respective access unit. Alternatively, each access unit may contain a respective buffer store to hold information from the store 66 or 70 temporarily. Provision would then be made for conflicting store access to be subject to a priority system, with access of lower priority being put on hold. Such arrangements are well-known in the art of digital electronics and will not be described in detail.

The distortion corrected SAR system of FIGS. 1, 4 and 5 invention operates by correcting raw data phase and range gate number in accordance with across-track aircraft position obtained from acceleration history obtained from contrast maximisation. A standard set of correlation functions are employed both in contrast maximisation and in subsequent focussing of corrected data. In contradistinction, the prior art of Blacknell et al proposes adapting the correlation functions to compensate for data errors, instead of correcting the data itself. It can be shown that the Blacknell et al approach leads to a substantial increase in correlation function storage and in correlator processing time as compared to the present invention, and provides a lesser degree of distortion correction in any event.

The operation of the FIGS. 4 and 5 SAR distortion correction system of the invention will now be described in more detail.

The first group of processing devices in FIG. 4 are employed solely to identify sixteen range gates exhibiting high contrast for subsequent use in contrast maximisation. This group comprises data access unit 68a, first microprocessor 80a, correlator 78a, function access unit 74a and second microprocessor 80b. In general, the range gates processed by correlator 78a will be misfocussed and distorted. Accordingly, there is little point in this processing being carried out at high resolution. In SAR processing, resolution is directly related to the length of, or number of function values in, the reference functions used in correlation. This length or number is defined as the length of the synthetic aperture, and is conceptually similar to the aperture of lens used in optical focussing. The first correlator 78a accordingly employs reference functions $e^{j\alpha x^2}$ which are one quarter the length of those used in contrast maximisation by second correlator 78b and corrected data processing in third correlator 78c. The first correlator 78a employs the central quarter-length section of reference functions employed elsewhere in full. The two synthetic aperture lengths are defined as $L_1$ and $L_4$, where $L_4 = 4L_1 = 500$ in the present example.

Each set of correlation operations in first and second correlators 78a and 78b involves determining a respective set of focussed image points for each range gate from which a respective contrast value may be determined. The number of image points in a set is defined as W(W=100 in the present example); ie conveniently these correlators produce the same number of image points per set. Each set of correlation operations therefore requires the synthetic aperture length +W raw data values, ie ($L_1 + W$) or ($L_4 + W$) values.

This corresponds to evaluating Equation (1) (repeated below for convenience) W times, where $L = L_1$ (correlator 78 a) or $L = L_4$ (correlator 78a), n = 1 to W and k = 1 to $L_1$ or $L_4$.

$$Y_n = \sum_{k=1}^{L} a_k d_{n+k} \quad (1)$$

Equation (1) is mathematically equivalent to moving a stream of successive data values in steps past a set of multiplicative coefficients and evaluating the sum of data/coefficient products at each step, since each $a_k$ multiplies successive values of $x_{n+k}$ as a n goes from 1 to W. Digital correlators arranged to carry out this procedure are known and will not be described, see for example British Pat. No. 2,106,287B.

The raw data store 66 receives a raw data value for each range gate from each radar pulse. In the present example there are 6,000 range gates per pulse. Autofocussing updates are carried out to re-establish aircraft across-track acceleration at time intervals over which this acceleration is most unlikely to change by more than ±0.01 meter sec$^{-2}$. This time interval may be determined from a knowledge of the dynamics of the radar platform. The figure for acceleration change arises from across-track depth of focus considerations.

The raw data store 66 and its controller 64 are arranged to produce "cylindrical" data storage; ie incoming raw data values for each range gate are stored in such a way that, when the final storage location for that range gate is reached, access returns to the beginning of that range gate. Accordingly, each successive raw data value then overwrites the oldest value currently stored in the relevant range gate. The store 66 holds in operation at least the $L_4 + W$ most recent raw data values for each range gate. The length of the store 66 is accordingly at least $L_4 + W$, and its depth is at least equal to the number of range gates, eg 6,000. Each storage location is six bits wide, three bits for each of the real and imaginary parts of a raw data value.

The three data access units 68a, 68b and 68c operate in a similar manner. Each responds to reception of a range gate number from microproessor 80a, 80c or 80e by addressing a respective sequence of data values from that range gate in the store 66. However, they obtain differing numbers of data values per range gate and there are relative offsets between the central addressed values. This is illustrated schematically in FIG. 6. Data access unit 68b obtains the most recent ($L_4 + W$) raw data values for the purposes of W correlation operations with a synthetic aperture $L_4$ wide. Data access unit 68a obtains ($L_1 + W$) values for W correlation each of $L_1$ points in a similar manner, but the average or central address accessed via this unit is offset by W towards more recent data. The third data access unit 68c is obtaining data for correction, and employs data addresses offset on the average by W to those less recent than obtained by unit 68b. This is indicated in FIG. 6, where vertical chain lines 120a, 120b and 120c indicate central address positions for the units 68a, 68b and 68c respectively. Horizontal solid lines 122a to 122c indicate corresponding address ranges, bidirectional arrows 124b and 124c indicate central address offsets and unidirectional arrows 126a and 126b indicate address change during correlation. The data store access arrangements illustrated in FIG. 6 permit parallel processing by the FIG. 4 distortion correction device 60; ie suppose that low resolution processing in first correlator 78a is taking place to determine the jth set of sixteen highest contrast range gates. At the same time, second correlator 78b is carrying out high resolution processing on the (j-1) th highest contrast range gate set, which corresponds to raw data addresses offset on the average by W to earlier values.

Moreover, data correction by means of fifth microprocessor 80e is simultaneously taking place on the basis of the (j-2)th set of highest contrast range gates, which corresponds to a 2W average data address offset towards earlier values.

The reference function access units 74a and 74b operate in a similar manner to stimulate reference function output from function store 70 via controller 72. Each of these units responds to reception of a range gate number from respective microprocessor 80a or 80e by outputting that number together with a function length indication to controller 72. The controller 72 responds by addressing the corresponding number of reference function values in each case, these being output to the relevant access unit and loaded by it into the respective correlator 78a or 78b.

Operation of the distortion correction device 60 proceeds in a series of repeated stages. Each stage begins with W new raw data values for each range gate being read into data store 66 from computer 62. This corresponds to a new strip of radar image data being processed, the strip being of width W measured along the aircraft track (azimuth). Input of the new strip values is accompanied by an initiate processing instruction output from the computer 62 simultaneously to each of the six microprocessors 80a to 80f. The computer 62 has an initiate instruction output I connected (not shown) to corresponding microprocessor initiate inputs Ia to If.

After storage of the new strip, the initiate instruction activates microprocessor 80a to output range gate no. 1 to reference function access unit 74a. This produces output from function store 70 of the central $L_1$ values of the reference function appropriate to range gate nos 1 to 250. $L_4$ values per reference function are stored at 70, but for low resolution processing only the central $L_1$ function values are required for the present stage. The values output are loaded by unit 74a into first correlator 78a. Microprocessor 80a now supplies range gate no. 1 to data access unit 68a. Data store 66 then outputs a stream of ($L_1 + W$) raw data values beginning with the value which is the $[\frac{1}{2}(L_4 - L_1) - W]$th since that most recent and ending with the $\frac{1}{2}(L_4 + L_1)$th. Correlator 78a correlates this data stream with its loaded function values to produce W processed image point values $P_n$, $Q_n$ for output to second microprocessor 80b. Here the values are employed to obtain a contrast figure. Microprocessor 80b calculates the contrast in a range gate by evaluating:

$$S_1 = \frac{1}{W} \sum_{n=1}^{W} (P_n^2 + Q_n^2) \quad (2)$$

$$S_2 = \frac{1}{W} \sum_{n=1}^{W} (P_n^2 + Q_n^2)^2$$

$$\text{CONTRAST} = \frac{\sqrt{(S_2 - S_1^2)}}{S_1}$$

Microprocessor 80b enters the contrast value and corresponding range gate number in an internal table arranged to accommodate sixteen contrast values. The correlation procedure is then re-initiated by microprocessor 80a outputting range gate no. 2 to data and function access units 68a and 74a. Range gates 1 to 250 employ the same reference function, and accordingly function access unit 74a does not furnish a new function. The data store 66 outputs for range gate 2 successive data values located equivalently to those output for range gate 1. Correlation and contrast calculation proceed once more.

This procedure is repeated until range gate 17 is reached. The contrast value and range gate number for range gate 17 is entered in the microprocessor 80b table only if it is greater than the least of the contrasts already there. It then overwrites that entry. This procedure then repeats until range at 251 is reached, at which function access unit 74a changes the correlation reference function to one appropriate to range gates 251 to 500.

The process continues until all range gates have been processed by correlator 78a with reference function change every 250 range gates. At this point the second microprocessor 80b table holds the sixteen highest contast range gates. The list of highest contrast range gate numbers is then output to third microprocessor 80c, which also receives the previous best or maximum contrast across-track aircraft acceleration from fourth microprocessor 80d. The third microprocessor 80c then generates a set of one hundred and one trial acceleration values spaced by 0.01 meter sec$^{-2}$ and centred on the previous best acceleration $A_{pb}$; i.e. the trial accelerations range from $A_{pb}-0.5$ meter sec$^{-2}$ to $A_{pb}+0.5$ meter sec$^{-2}$. The acceleration values are spaced by one depth of focus, i.e. the spacing is the minimum which will produce a detectable change in focussing.

The third microprocessor 80c subsequently arranges for raw data from the sixteen highest contrast range gates to be processed at high resolution on the basis of each of the trial accelerations. It simulates the effect of across-track acceleration by changing the correlation reference functions used for range gate processing. The relationship between reference function and across-track acceleration arises as follows. Relative to the aircraft platform, and assuming a linear aircraft track, scatterers execute apparently curved, generally parabolic paths as they pass through the radar beam. Their closest distances of approach correspond to the broadside-on position. The closer the scatterer approaches the more curved the path, and the greater is the phase change exhibited by the scattered signal as the scatterer moves through the beam.

Accordingly, the phase factor $\alpha$ in the correlation reference function $e^{j\alpha x^2}$ is required to be greater for shorter range scatterers; i.e. $\alpha$ reduces with increasing range gate number. However, across-track acceleration curves the aircraft track, and consequently changes the apparent curvature of a scatterer's path relative to the aircraft. Scatterer path curvature is reduced or increased according to whether across-track acceleration is positive or negative, i.e. towards or away from the scattering region. The change in curvature implies a corresponding change in correlation reference function required to produce focussing. Since reference functions are addressed via range gate numbers, across-track acceleration change is simulated by change in range gate number employed for reference function selection. The number of reference functions required in the simulation depends on the variation in across-track acceleration to be accommodated. In the present example, two hundred reference functions have been considered appropriate.

In operation, the third microprocessor 80c reads in the list of sixteen highest contrast range gates from microprocessor 80b. For each of these range gates it obtains a respective set of one hundred and one modified range gate values. It employs an internal look-up table in which modified range gate values are addressed by a combination of across-track acceleration and range-gate number. It supplies the first range gate number to second data access unit 68b and the first of the modified range gate values in the corresponding set to the second function access unit 74b. The unit 74b loads the reference function corresponding to the modified range gate value into the second correlator 78b, and the latter receives data from the first range gate number of the sixteen of highest contrast via the second data access unit 68b. As previously discussed, data access unit 68b obtains data offset in time on the average by W towards earlier values to allow for the processing delay occurring during the previous low resolution processing (see FIG. 6). i.e. $(L_4+W)$ raw data values and $L_4$ reference function values are employed. The processed image data is output from correlator 78b to fourth microprocessor 80d, where it is employed to calculate a high resolution contrast value using Equation (2) once more. This procedure is repeated for the first range gate number for each of the corresponding modified range gate values to provide one hundred and one contrast values. Microprocessor 80d then outputs the second of the sixteen highest contrast range gate numbers to data access unit 68b and the first of the corresponding set of modified range gate values to function access unit 74b. The procedure then continues as before.

In this way all sixteen highest contrast range gates are processed with reference functions corresponding to each of the one hundred and one trial accelerations to produce 1616 contrast values. Microprocessor 80d then calculates a respective sum of contrasts over all sixteen range gates for each of the trial accelerations, and determines which of the trial accelerations produces maximum contrast. Averaging contast over a number of range gates in this way reduces the effects of speckle noise, to which an individual range gate contrast value would be subject. The maximum contrast acceleration is then output to third and fifth microprocessors 80c and 80e.

Microprocessor 80e employs the maxmimum contrast acceleration to update the across-track position error on a radar pulse by pulse basis. This corresponds to an update interval of 1/F where F is the average pulse repetition frequency. For F=1.6 kHz in the present example, the average update interval is 0.625 milliseconds in terms of aircraft time of flight. To calculate the across-track position and velocity $R_j$ and $V_j$ for the jth radar pulse, the microprocessor 80e employs the (j−1)th equivalent values previously determined and stored; i.e. microprocessor 80e evaluates:

$$R_j = R_{j-1} + V_{j-1}/F \tag{3}$$

$$V_j = V_{j-1} + A_j/F \tag{4}$$

where $A_j$ is the jth or current maximum contrast acceleration. Strictly speaking, Equation (3) should employ $\frac{1}{2}(V_j+V_{j-1})$ instead of $V_j$, but the error introduced is negligible.

$R_j$ and $V_j$ are stored in internal memory by the microprocessor 80e, and $R_j$ is also employed to calculate correction factors. Corrections are required to both the phase of each raw data value and to the range gate number to which it corresponds, as previously described. However, the position error affects all range gates equally, and introduces a constant shift in both phase and range gate number. The microprocessor 80e accordingly computes modified range gate numbers $N'_{RG}$ and a single phase shift value $\Delta\phi_j$ given by:

$$N'_{RG} = N_{RG} + R_j/\delta R \tag{5}$$

$$\Delta\phi_j = 4\pi R_j/\lambda \tag{6}$$

where $N_{RG}$ is the unmodified range gate number, $\delta R$ is the range interval per range gate, $\lambda$ is the radar wavelength and $2\pi/\lambda$ is the radar wavenumber. For 6,000 range gates in a 9 km depth of scene, $\delta R = 1.5$ meters. $(N'_{RG} - N_{RG})$ is accordingly equal to 1 for each 1.5 meters of aircraft displaement across track, and is rounded to a whole number. If $N'_{RG}$ is <0 or >6,000, it and corresponding $N_{RG}$ values are ignored. At a wavelength of 3 cm, $\Delta\phi$ is equal to $4\pi/3$ for each centimetre of displacement across track.

Having evaluated Equations (5) and (6), microprocessor 80e outputs $\Delta\phi$ as a six-bit number to the six higher order bit address inputs of the phase correction look-up table 84. It then supplies successive unmodified and modified range gate numbers $N_{RG}$ and $N'_{RG}$ to third data access unit 68c and output 86. The unit 68c responds by obtaining supplying successive raw data values each corresponding to a respective $N_{RG}$ to the look-up table 84 to provide its six lower order bit address inputs. The table 84 contains corrected raw data values at each twelve bit address; accordingly each raw data input produces a corrected raw data output simultaneously with output of a corresponding value of $N_{RG}$ from output 86.

Having counted through all values of $N_{RG}$ for which $0 < N'_{RG} < 6,000$, microprocessor 80e repeats this procedure for data from succeeding radar pulses. This continues until raw data and range gate values have been corrected for a strip of aircraft track corresponding to W radar pulses. As described previously, the data obtained by access unit 68c is offset on the average by W and 2W towards earlier received data as compared to that simultaneously obtained by units 68b and 68a respectively. This procedure accordingly generates a set of W raw data values for each range gate each with a corrected range gate number.

Referring now to FIG. 5, the SAR processing device 100 is equivalent to conventional processors except that it employs corrected raw data and range gate numbers. It operates at high resolution, but its operation is otherwise similar to the processing carried out by first correlator 78a and associated devices. The corrected data store 102 holds $L_4+W$ corrected raw data values for each modified range gate number. In the present example, $W=100$ and $L_4=500$, so the store 102 holds corrected data for 6W or 600 radar pulses. When the distortion correction device 60 produces a new set of W corrected raw data values for each modified range gate, these are fed by controller 104 into the store 102. The store 102 is arranged cylindrically as previously described for uncorrected raw data store 66. Each new set of W values for each range gate accordingly overwrites the oldest W values contained therein.

When new data has been read into the store 102, correlation proceeds at high resolution in third correlator 78c. All $L_4=W$ corrected raw data values are employed, together with reference functions obtained by third access unit 74c via output 88 from reference function store 70. The sixth microprocessor 80f counts through successive corrected range gate numbers, furnishing them to store controller 104, function access unit 74c and processed image store controller 106. Each range gate number output from the microprocessor 80f accordingly stimulates loading of a corresponding reference function $L_4$ points in length into correlator 78c, which also receives input of all $L_4+W$ corrected raw data values from store 102 via controller 104. This produces W focussed image points per range gate output to image store controller 106, which assigns them to the corresponding corrected range gate number in image store 108. The procedure continue until all range gates have been processed, and then the SAR processing device 60 awaits the next set of corrected data.

The image store 108 eventually builds up corrected image data for the whole aircraft track from successive strips of length W. As has been said, the data is corrected to a linear baseline through the initial aircraft position and along its initial velocity vector. The corrected image data therefore corresponds to rectilinear geometry as illustrated in FIG. 2. In a computer simulation of the invention, a typical corrected image was found to be geometrically accurate to ±3 meters (2 range gates) over imaged scene about 4×6 kilometres in area.

Referring now to FIGS. 7 and 8, these show the same scene overlaid with a corresponding SAR image. The scale is approximately 1cm=400 meters in both cases. FIG. 7 was obtained with uncorrected data, but FIG. 8 was obtained using data corrected in accordance with the invention. In both illustrations, the scene is represented by varying grey tones and the SAR image as overlying dotted lines in light tone. FIG. 7 is arranged to be correctly registered and orientated in the centre, but it is apparent that this produces gross misregistration elsewhere. In particular, one SAR image feature in the lower left of FIG. 7 comprising a rectangle adjacent a trianle is misregistered with the map by about 150 meters. In comparison, FIG. 8 obtained in accordance with the invention exhibits considerably more accurate registration between scene and SAR image in azimuth. There remains a small degree of error in the range dimension which is inevitable in all SAR imaging. It arises because variation in height of features in a scene gives rise to an apparent range error; for example, the top of a hill 300 meters high will be closer to an overflying aircraft than a point at sea level vertically below the top of the hill. Thus increase in height reduces apparent range. This error can however be corrected from a knowledge of scene topography. A SAR image obtained in accordance with the invention is sufficiently accurate to be compared with a corresponding map and subsequently corrected in the range dimension.

Data corection in accordance with the previous example of the invention is valid so long as the phase correction to be applied does not change by more than $\pi$ radians between successive radar pulses. If this is not satisfied the phase correction will alias. From Equation (6) it is required that:

$$\Delta\phi_j - \Delta\phi_{j-1} = 4\pi(R_j - R_{j-1})/\lambda \leq \pi \quad (7)$$

Equations (3), (6) and (7) imply:

$$R_j - R_{j-1} = V_{j-1}/F \leq \lambda/4 \quad (8)$$

i. e.

$$V_{j-1} \leq \lambda/4 \quad (9)$$

In the preceding example, $F = 1.6$ kHz and $\lambda = 0.03$ meters, which requires the across-track velocity not to exceed 12 meters/sec.

Over a sufficiently long aircraft flight, variation in aircraft flight direction may produce an across-track velocity exceeding $\lambda F/4$. For example, an aircraft flying at 200 meters/sec which changes its flight path by 4 degrees will have an across track velocity above 12 meters/sec. To avoid aliasing of phase corrections, flight paths are divided into sections over which the across-track velocity change does not exceed $\lambda F/4$. At the beginning of each section, the across track velocity is reset to zero. This is geometrically equivalent to periodically changing the direction of the baseline reference to which data is corrected.

Subsequently, individual sections of the SAR image may be relatively rotated for conformity with one another.

Data corrected in accordance with the invention produce images sufficiently accurate to allow one image of a scene to be superimposed on another obtained from a different aircraft flight. This allows scene change to be monitored. However, one image will require rotation and translation relative to the other since the aircraft track will change between flights. Magnification of one image relative to the other is not required because the raw SAR data is automatically corrected for aircraft speed variation by the master timing unit 14.

Images are brought into approximate alignment using flight path information obtained from the aircraft instrumentation. More accurate alignment is achieved by cross-correlating a small area of one image with a corresponding area of the other. The invention produces sufficiently accurate and well-focussed images to allow features of one image to be easily identified with corresponding features of the other. The size of the second of these areas is chosen to reflect the uncertainty in the registration of the two images. A small area is taken from the first image to minimise correlation peak broadening due to uncertainties in the rotation angle. The results of these small area correlations are used to derive a series of offsets between the two images at various points on each of them. The rotation and translation required for accurate superposition of the images is then determined by a least squares fitting process. After rotating and translating of one image relative to the other, the images may be overlaid for comparison. This procedure may be carried out by an appropriately programmed computer.

Scene change may be determined very conveniently by a human operator by comparing two images on a cathode ray tube (CRT) display. The display is arranged to switch back and forth between the two images. The result is that scene features present in one image but not the other are seen to "blink" at the switching rate. Since "blinking" scene features are particularly noticeable, this provides a most convenient technique for determining changes in a scene.

Since SAR is a coherent imaging technique, the image is subject to speckle noise. This may create difficulties for a human operator monitoring scene change. Speckle noise may be reduced by incoherent averaging over groups of pixels at the expense of reduced resolution; i.e. the image is divided into areas each of n pixels, and the intensity of each area is averaged over its pixels reducing noise by $\sqrt{n}$.

Change detection may be performed automatically by, for example, threshold detection of targets in two different images. This is followed by comparison of the targets obtained. Bright targets present in one image but not the other indicate scene change. Alternatively, each image may be decomposed into a respective set of scene features, and features compared between images to determine change.

As an alternative to obtaining an across-track acceleration estimate from contrast maximisation, this estimate may be obtained by "multilook" processing as previously mentioned briefly. In this technique, the synthetic aperture is divided into two halves and an image is formed by correlation processing of each half. This corresponds to an image of a scatterer in the forward half of the radar beam being compared to its image in the aft half with respect to the aircraft. With correct focussing, the two images align perfectly. When focussing is incorrect, the two images are shifted or misregistered with respect to each other to a degree which increases with the amount of defocus. This is manifest by a change in apparent azimuth position. Accordingly, a series of trial accelerations is employed and the two images are focussed by correlation processing as previously described. Each pair of images obtained for each trial acceleration is compared to determine degree of misregistration. That acceleration producing the smallest degree of misregistration is employed to correct raw SAR data as previously described.

We claim:
1. A synthetic aperture radar system comprising:
   (a) means for generating raw synthetic aperture radar data;
   (b) means for
      (i) processing the raw data on the basis of trial across-track platform accelerations to obtain successive estimates of that acceleration,
      (ii) correcting the phase and range of the raw data in accordance with across-track position and velocity obtained from successive acceleration estimates, and

(iii) correlating phase-corrected raw data on the basis of reference functions selected in accordance with corrected range to provide image data; and
(c) means for storing and/or displaying the image data as a function of azimuth and corrected range.

2. A synthetic aperture radar system comprising:
(a) means for generating raw synthetic aperture radar data;
(b) means for
   (i) processing the raw data on the basis of trial across-track platform accelerations to obtain successive estimates of that acceleration,
   (ii) correcting the phase and range of the raw data in accordance with acrosstrack position and velocity obtained from successive acceleration estimates, and
   (iii) correlating phase-corrected raw data on the basis of reference functions selected in accordance with corrected range to provide image data; and
(c) means for storing and/or displaying the image data as a function of azimuth and corrected range wherein said system includes means for rotating and translating an image of a scene into registration with a different image of that scene.

3. A synthetic aperture radar system according to claim 2 wherein said system includes displaying means arranged to display the two images alternately when in registration.

4. A synthetic aperture radar system according to claim 2 wherein said system includes threshold detecting means arranged to detect bright image features and comparing means arranged to indicate such features when present in a first image but not present in a second image.

5. A synthetic aperture radar system according to claim 2 wherein said system includes means for decomposing images into a set of scene features, and means for comparing features for different images to determine scene change.

6. A synthetic aperture radar system according to claim 1 wherein said means for processing, correcting and correlating raw data comprises:-
(a) a correlator arranged to process the raw data at low resolution with reference functions selected on the basis of uncorrected range,
(b) means for computing contrast in each range interval and for selecting a subset of high contrast range intervals,
(c) means for reprocessing the range interval subset at high resolution with reference functions selected on the basis of a range of trial across-track accelerations, the reprocessing means being arranged to indicate an acceleration giving rise to a maximum sum of range interval contrasts over the subset,
(d) means for generating raw data corrected in both phase and range from maximum contrast acceleration history derived from successive operations of the reprocessing means, and
(e) means for processing phase-corrected raw data with reference functions selected on the basis of corrected range.

7. A synthetic aperture radar according to claim 6 wherein said correlator, reprocessing means and corrected data processing means are arranged to employ reference functions selected from a common set.

* * * * *